United States Patent [19]

Roberts et al.

[11] Patent Number: 5,535,498
[45] Date of Patent: Jul. 16, 1996

[54] HOLE PROBE METHOD

[75] Inventors: Bradley M. Roberts, Williamsville; Mark F. Cassidy, Orchard Park; John W. Zienkiewicz, North Tonawanda, all of N.Y.

[73] Assignee: Gemcor Engineering Corp., Buffalo, N.Y.

[21] Appl. No.: 233,815

[22] Filed: Apr. 26, 1994

Related U.S. Application Data

[62] Division of Ser. No. 971,890, Nov. 4, 1992, Pat. No. 5,329,691.
[51] Int. Cl.⁶ .............................. B21J 15/10; G01D 21/00
[52] U.S. Cl. ............................. 29/407.05; 29/701; 29/714
[58] Field of Search ............................. 29/407, 720, 701, 29/702, 703, 705, 714, 525.1, 706, 525.2; 73/151; 33/304, 302; 324/219; 364/474.37

[56] References Cited

U.S. PATENT DOCUMENTS

| | | | |
|---|---|---|---|
| 3,534,896 | 10/1970 | Speller et al. | 72/455 X |
| 5,042,137 | 8/1991 | Speller, Sr. | 29/525.2 |
| 5,060,362 | 10/1991 | Birke et al. | 29/525.2 |

*Primary Examiner*—Irene Cuda
*Attorney, Agent, or Firm*—Hodgson, Russ, Andrews, Woods & Goodyear

[57] ABSTRACT

In an automatic fastening machine 10 including a frame 12 for operating a workpiece 16 along a work centerline and having a drilling tool for drilling a hole in the workpiece, a bucking ram 26, and a milling tool 30 having a hole inspection assembly 22 mounted on the upper ram 88 thereof. The hole inspection assembly includes a hole probe assembly 24 that is movable axially along the work centerline to insert a probe member 25 into a position inside the hole in the workpiece. The probe is provided with a plurality of capacitor plates 25B that measure the peripheral extent of the hole to insure that the hole is drilled within a tolerance range and is also properly positioned on the workpiece before a fastener is inserted. The probe assembly has several proximity limit switches 138 and 152 that detect movement between a cylinder bracket 72 biased to a probe connector 74 to signal a central processor 300 to discontinue axial movement of the probe along the work centerline should the probe contact the workpiece or a foreign object before it locates properly inside the hole.

8 Claims, 4 Drawing Sheets

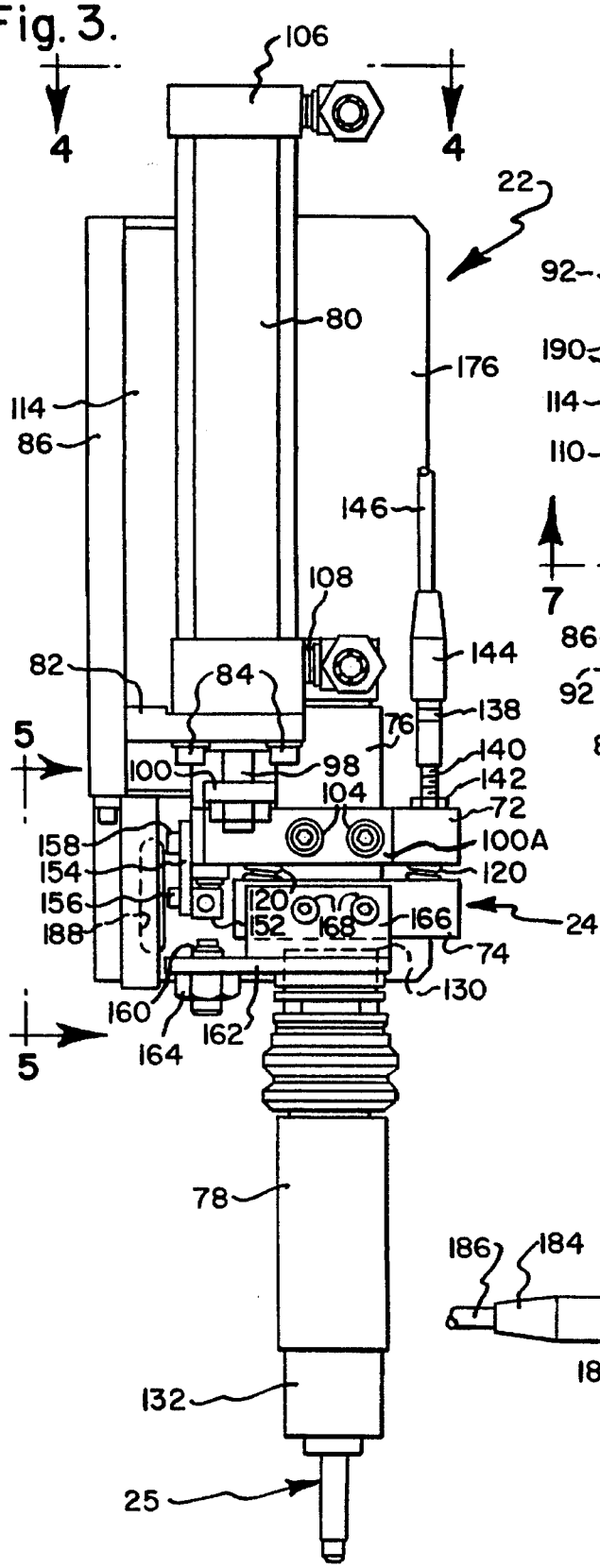

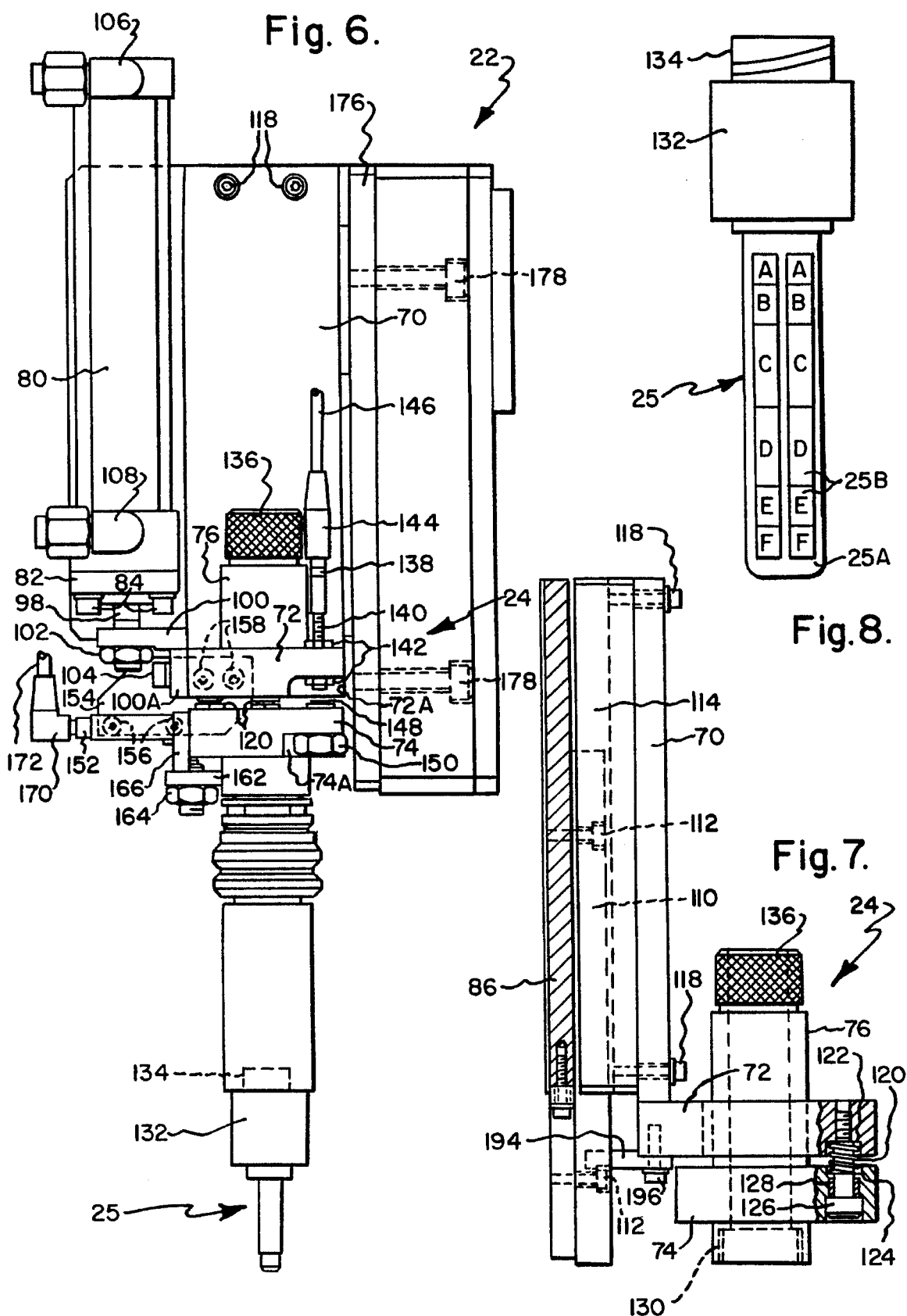

HOLE PROBE METHOD

This is a divisional Ser. No. 07/971,890 filed on Nov. 4, 1992, now U.S. Pat. No. 5,329,691.

BACKGROUND OF THE INVENTION

The invention relates to the art of automatic fastening machines, and more particularly to an inspection assembly which ensures that a hole in a workpiece has been drilled or otherwise formed to specification and is also properly positioned.

One area of use of the present invention is in automatic drilling and riveting machines wherein a drill forms a hole in two metal worksheets to be joined. A fastener, such as a rivet, is then inserted into the hole and upset to join .the worksheets. However, before the inserting and upsetting operations, it is beneficial to know that the hole conforms to predetermined specifications. A probe according to the present invention is thus moved along a work centerline corresponding to the hole center axis and introduced into the hole. Capacitance plates mounted around the periphery of the probe measure the hole size and degree of roundness. Furthermore, an undersized hole can be measured for subsequent operations such as cold working, reaming and countersinking whereupon the hole can be measured again for size and quality. These measurements can be recorded and plotted to determine trends as, for example, to indicate when a drill bft is wearing and needs replacing. In addition, measurements can be made of selected depths in the hole, and variable stack thicknesses of workpieces can be accommodated. The probe can be accurately positioned axially along the center axis to measure a targeted portion of the hole, such as a portion below a countersink. Furthermore, the probe can be used to insure that the hole position is at a desired location in the worksheets.

SUMMARY OF THE INVENTION

It is therefore a primary object of this invention to provide a hole inspection assembly for measuring the perimeter characteristics and dimensions of a hole provided in a workpiece and for determining that the hole has been properly positioned in the workpiece.

It is a further object of this invention to provide a hole inspection assembly having a probe member that can be moved axially along a hole centerline to precisely position the probe in the hole for measuring a specific portion of the hole at selected depths.

It is still a further object of this invention to provide a hole inspection assembly in an automatic drilling and riveting machine and having a probe for measuring the perimeter dimensions of a rivet receiving hole and for recording and plotting those dimensions to determine trends in the drilling operation.

The present invention provides in an automatic apparatus comprising a frame defining a work axis with respect to a workpiece held in position relative to the frame, a tool means having a first stationary component mounted on the frame and a second component that is movable towards and away from the workpiece along a tool axis to operate on the workpiece, a transfer means mounted on the frame and operatively associated with the tool means for moving the tool means into and out of positional alignment with the work axis, wherein the tool axis is coincident with the work axis when the tool means is in positional alignment and a probe means mounted on the first component of the tool means and defining a probe axis that is spaced from the tool axis. The probe means is movable into an operative position with the probe axis being coincident with the work axis when the transfer means moves the tool means out of positional alignment with the work axis whereupon the probe means is then axially movable along the work axis and into and out of a hole provided in the workpiece. A control means is operationally associated with the transfer means for selectively directing movement of the respective tool means and the probe means into and out of positional alignment with the work axis, and the control means further regulates the axial movement of the probe means along the work axis to locate the probe means at a predetermined depth in the hole provided in the workpiece to enable the probe means to measure characteristics of the hole such as size, peripheral extent, degree of roundness and shape. A readout means is operatively associated with the probe means to provide hole information such as measurements obtained by the probe means. A collision detecting means operatively associated with the probe means senses resistance to movement of the probe means into the hole and causes the control means to prevent any further movement of the probe means.

The foregoing and additional advantages and characterizing features of the present invention will become increasingly apparent by reference to the following description and the drawings.

IN THE DRAWINGS

FIG. 1 is a side elevational view of an automatic fastening machine 10 provided with a hole inspection assembly 22 according to the present invention.

FIG. 2 is a side elevational view of the automatic fastening machine 10 shown in FIG. 1 and showing the upper head assembly 32 including the hole inspection assembly 22 of the present invention mounted to the upper ram assembly 88 of a milling tool 30 and a bucking ram 26.

FIG. 3 is a side elevational view of the hole inspection assembly 22 shown in FIG. 1 and particularly showing the hole probe assembly 24.

FIG. 4 is a plan view along line 4—4 of FIG. 3 of the hole inspection assembly 22 of the present invention.

Figure 1:
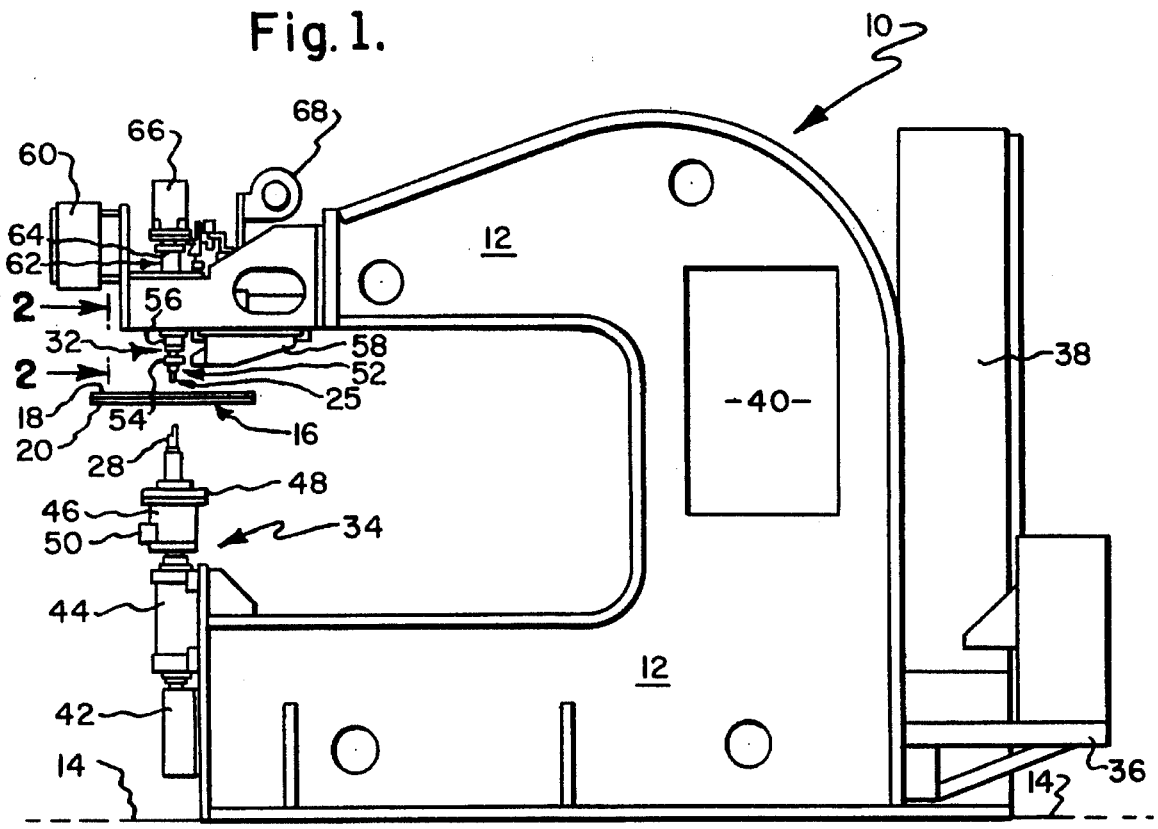

FIG. 5 is a partially broken away end view along line 5—5 of FIG. 3 showing a proximity switch 180 that cooperates with associated trigger plate 194 to indicate when the hole probe assembly 24 of the present invention is in a fully retracted position.

FIG. 6 is a front elevational view of the hole inspection assembly 22 of the present invention and including the hole probe assembly 24 and probe 25.

FIG. 7 is a partially cross-sectional view along line 7—7 of FIG. 4 and showing the cylinder bracket 72 and probe connector 74 holding compression spring 120 comprising the hole probe assembly 24 of the present invention without the probe body 78 and probe 25.

FIG. 8 is an elevational view partially in schematic of the probe 25 and showing the capacitor plates 25B.

Figure 9:
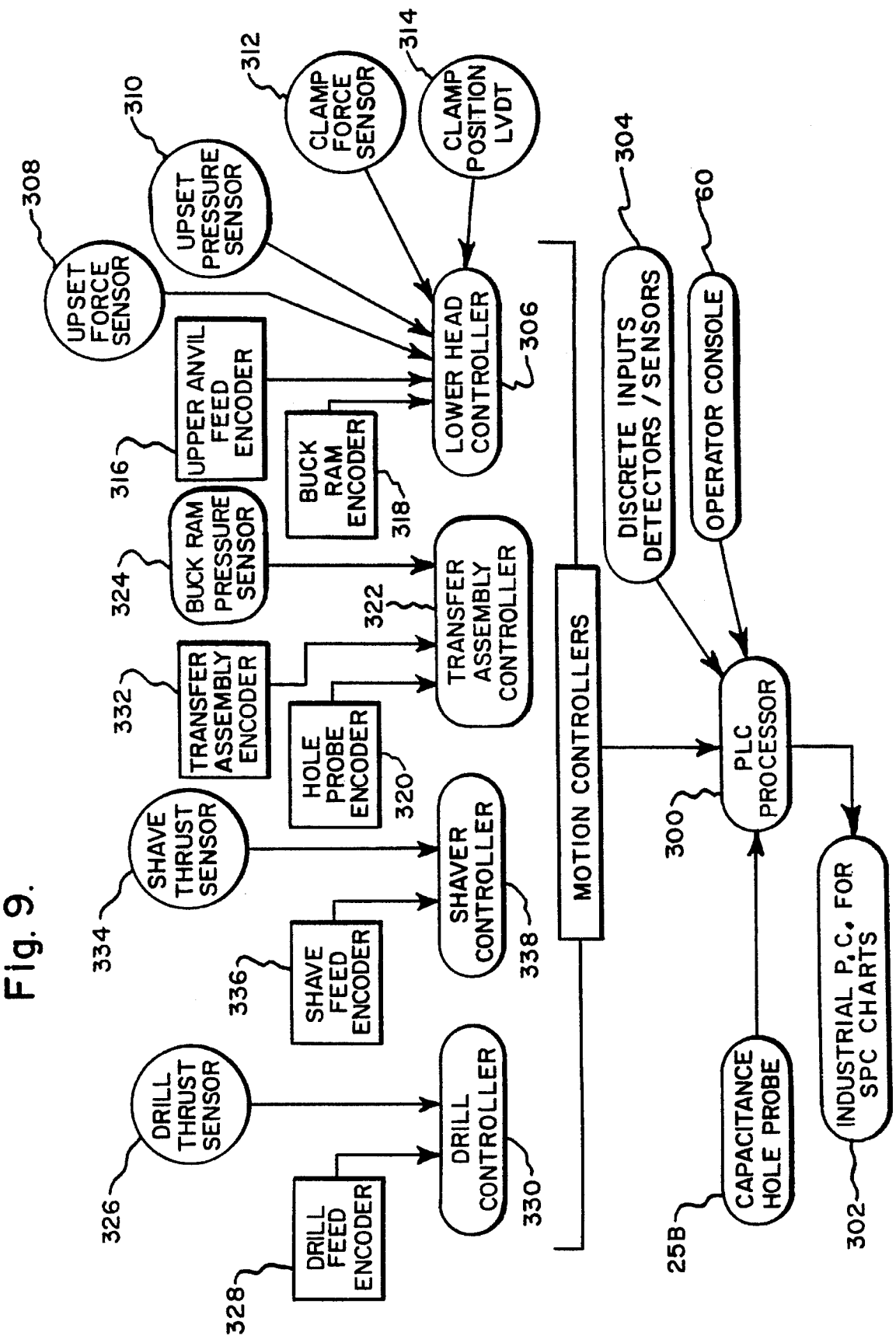

FIG. 9 is a block diagram and flow illustrating the signal control for the automatic fastening machine 10 including the hole inspection assembly 22 of the present invention.

SPECIFIC DESCRIPTION

FIG. 1 shows one form of an illustrative automatic fastening machine to which the present invention is applicable and it is in the form of an automatic drilling and riveting machine, generally designated 10. Machine 10 includes a generally C-shaped frame 12 supported on a surface 14, such as the floor of a factory. Briefly, a workpiece 16 comprising two metal worksheets 18, 20 to be joined is introduced into the C-shaped jaws of the machine 10 and clamped together by pneumatic and/or hydraulic pressure in a known manner. This holds the sheets 18, 20 during the drilling operation, assuring exact hole alignment and eliminating burr formation on the inside surfaces. After a hole is drilled in workpiece 16 by machine 10, an air cylinder or other suitable motive means shuttles the drill (not shown) out of position and centers the hole inspection assembly of the present invention, generally designated 22, over the hole. A probe assembly 24 portion of the inspection assembly 22 is then moved axially along a work centerline or a drilling and riveting axis, i.e. vertically as viewed in FIG. 1, to move a hole probe 25 to a centered position inside the hole for measuring characteristics including the entire periphery of the hole. As shown in FIG. 9, this hole information is fed to a central processor unit 300 having an output device 302 which, for example, can be a printer, a CRT, or a magnetic storage tape. If the hole measurements are acceptable and within a range of parameters, the probe 25 is removed and a rivet insertion device (not shown) is centered over the hole. A rivet (not shown) is inserted and squeezed or upset by the hydraulic pressure applied from above by a bucking ram 26 and froin below by a lower anvil 28 in a known manner. This forms an upper and a lower head on the rivet which serves to hold the metal worksheets 18, 20 together. A rivet head milling tool, generally designated 30 in FIG. 2, then moves into operative position with respect to the upper rivet head to shave the material above the upper surface of upper metal sheet 18 down to the surface of the sheet 18. The machine cycle is completed very quickly and all functions are precisely controlled.

It is to be understood that the automatic drilling and riveting machine 10 shown in FIG. 1 is an illustrative example of many types of automatic machine tool apparatus to which the present invention is applicable. Accordingly, the following description of machine 10 is to facilitate an understanding of the hole inspection apparatus 22. As shown in FIG. 1, machine 10 includes an upper head assembly 32 and a lower head assembly 34 both carried by frame 12. Both upper and lower assemblies 32 and 34 respectively, are mounted on frame 12 so that a work centerline alignment is maintained between their respective tooling, i.e. the lower anvil 28 and selectively an upper head drill (not shown), the bucking ram 26, the hole inspection assembly 22 and the milling tool 30. Platform 36 is part of a hydraulic pumping assembly on the opposite end of the frame 12, and electrical controls are located within a housing 38 on frame 12 adjacent platform 36. Hydraulic controls are located on a panel 40 mounted on the web or central vertical section of frame 12. Pneumatic controls are located on a panel (not shown) at a corresponding location on the opposite side of frame 12. The electrical, hydraulic and pneumatic controls are collectively grouped together as block 304 in FIG. 9.

The lower head assembly 34 includes an upset cylinder 42 and a lower ram 44 combined to form a tandem cylinder, a clamp cylinder 46, a turntable 48 and the lower anvil 28. Operation of lower head assembly 34 is monitored by a lower head controller 306 connected to central processor 300 and mounted on clamp cylinder 46. Lower head controller 306 receives inputs from upset force sensor 308 and upset pressure sensor 310 mounted on upset cylinder 42 and inputs from a clamp force sensor 312 and clamp position detector 314 mounted on clamp cylinder 46 (FIG. 9). Clamp position detector 314 outputs to lower head controller 306 a voltage signal proportional to the linear displacement of clamp 46. The lower ram 44 is free to reciprocate vertically along the work centerline within a cylindrical cavity. Upset cylinder 42 moves lower ram 44 as necessary to perform the upsetting operation. The turntable 48 to which lower anvil 28 attaches mounts on lower ram 44.

The upper head assembly 32 includes a pressure foot assembly, generally designated 52, which is the upper member of the clamping arrangement of machine 10. The workpiece 16 is clamped against the lower surface of a pressure foot bushing (not shown) depending from a pressure foot plate 54 of the upper head assembly 32 by pressure from the lower ram assembly 44, which raises the lower anvil 28 against the lower surface of workpiece 16. The pressure foot assembly 52 of the illustrated automatic fastening machine 10 preferably includes a pair of spaced apart pneumatic cylinders, one of which is designated 56 and the other of which is parallel with and behind cylinder 56 in FIG. 1, that provide rigid clamping pressure on the upper surface of workpiece 16 during the drilling and hole inspection operations and resilient pressure during upset of the rivet to prevent dimpling of the workpiece 16. The upper head assembly 32 also includes a hopper 58 for holding each rivet prior to insertion into the hole drilled in the workpiece 16 and an operator console panel 60 containing various controls for machine 10.

Figure 2:
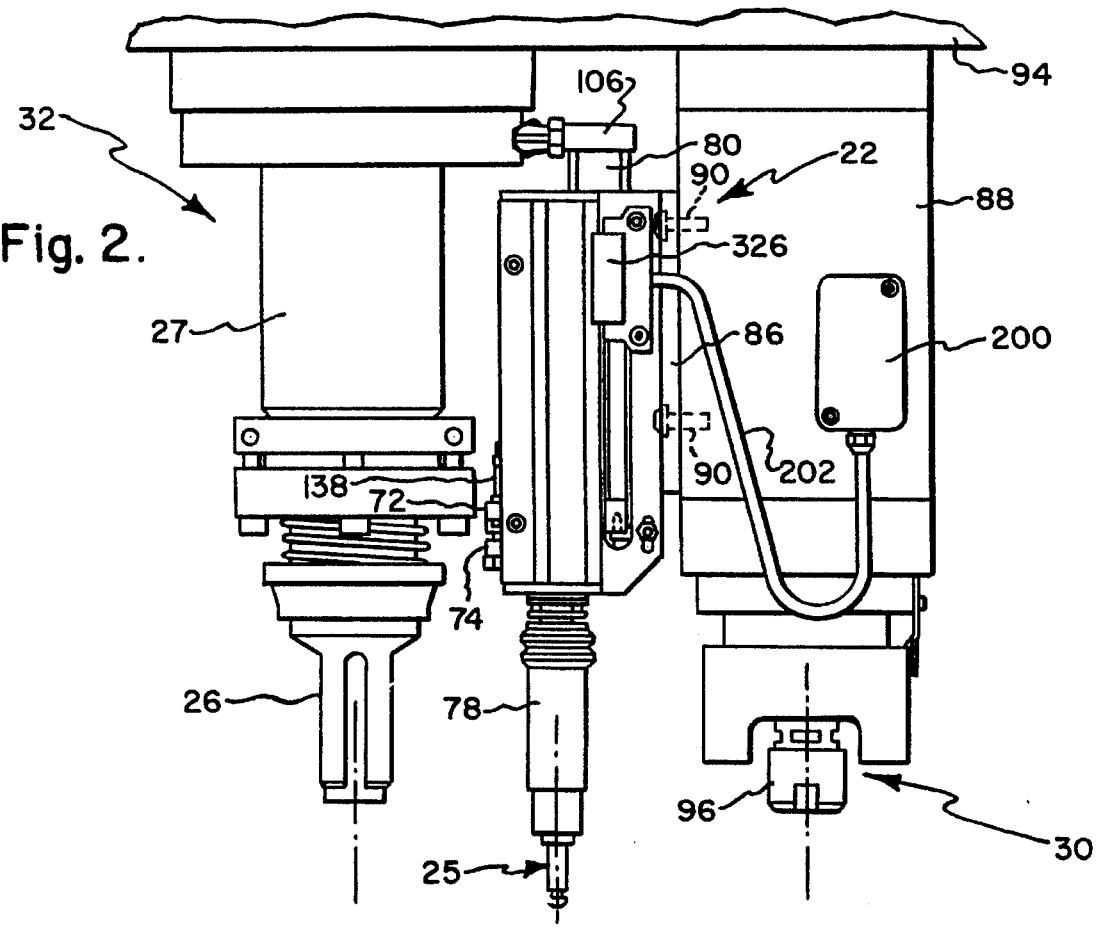

The upper head assembly 32 further includes a drill spindle assembly, generally designated 62, for drilling the rivet receiving hole in the workpiece 16, an upper anvil 26 shown in FIG. 2 and rivet fingers (not shown), and the bucking ram 27. Encoder 316 is associated with upper anvil 26 and encoder 318 is associated with bucking ram 27. These encoders 316, 318 supply the lower head controller 306 with travelling movement information for processing by central processor 300. The rivet fingers provide for catching and supporting the rivet released from hopper 58 and then for aligning the rivet along the work centerline for inserting the rivet into the hole in a known manner. This occurs only after the hole inspection assembly 22 has moved the hole probe assembly 24 along the work centerline to position the probe 25 inside the hole to thereby determine that the hole has been drilled to specification including being properly aligned along the work centerline. Movement of hole probe assembly 24 is signalled to a transfer assembly 94 (FIG. 2) by a hole probe encoder 320 connected to a transfer assembly controller 322. The bucking ram 27 then provides for bucking the rivet head with anvil 26 while upset pressure is applied from below by the lower ram 44. Bucking ram pressure is controlled by sensor 324 connected to transfer controller 322.

The drill spindle assembly 62 includes a drill ram 64 movable linearly toward and away from workpiece 16. The drill spindle (not shown) is rotatably mounted in drill ram 64 and is provided with a depending drilling tool (not shown) facing the workpiece 16. Rotational movement of the drill spindle is provided in the illustrated apparatus by a direct drive electric or hydraulic motor 66 while drilling thrust and feed are measured by sensor 326 and encoder 328 and fed to drill controller 330. Motor 66 is carried by ram 64 and-the output shaft of motor 66 is directly connected to the drill spindle such that the respective axes of rotation of the motor output shaft and drill spindle are coincident. If motor 66 is electric, a fan 68 is preferably provided to cool motor 66 during operation of machine 10.

The hole inspection assembly 22 according to the present invention is shown in detail in FIGS. 2 to 9. The hole probe assembly 24 comprises a normally vertically disposed probe mounting bracket 70 (FIGS. 4, 6 and 7) having a cylinder bracket 72 extending perpendicular thereto from a lower end thereof. Bracket 70 also has an associated probe connector member 74 disposed in closely spaced, substantially parallel relation to and below cylinder bracket 72 as shown in FIGS. 3 and 6. A conduit 76 disposed in spaced, substantially parallel relation to mounting bracket 70 as shown in FIG. 4 extends through bracket 72 and connecter member 74, being held in place by member 74. The lower end of conduit 76 as viewed in FIG. 3 is mated to one end of a probe body 78, the probe 25 extending from the opposite end of body 78. The mounting bracket 70 is linearly movable along a plane parallel with and spaced from the work centerline by means of a probe cylinder 80 mounted on a web 82 by bolts 84 as shown in FIGS. 3 and 6. Web 82 is fixed to and extends substantially perpendicular to a cylinder and slide bracket 86 that is secured to the upper ram assembly 88 of the milling tool 30 by bolts 90 (FIG. 2) fitted in openings 92 (FIG. 4) in bracket 86. Upper ram assembly 88, in turn, is mounted on transfer assembly 94 which is operatively associated with transfer encoder 332 that signals transfer controller 322 to shuttle the milling tool 30 into and out of the operative position wherein the shaving bit 96 is aligned along the work centerline. It should be understood that bracket 86 can also be mounted to the upper ram assembly 26A of bucking ram 26 or to a non-axially movable portion of the drill or to transfer assembly 94. The exact positioning is generally dictated by design preference, the only requirement being that bracket 86 is mounted to a component of the machine tool apparatus that is movable into and out of axial alignment with the work axis. Mounting of bracket 86 as shown herein to upper ram assembly 88 is preferred for reasons of stability. For a more detailed description of operation of a transfer assembly like assembly 94, reference may be made to U.S. Pat. No. 3,534,896, the disclosure of which is incorporated herein by reference.

When transfer assembly 94 moves milling tool 30 into axial alignment with the work axis or centerline, upper ram assembly 88 provides for reciprocating movement of the shaving bit 96 along the work centerline for shaving the upper head from the rivet after the rivet has been upset to join the worksheets 18 and 20. In other applications not described herein, but which are known to those of ordinary skill in the art, milling tool 30 is useful for reaming operations wherein it is desired to countersink the hole before the rivet is inserted and to ream the hole after a cold work operation. Shaving bit thrust sensor 334 and shaving bit feed encoder 336.are connected to a shaver controller 338 that communicates with the central processor 300.

When transfer assembly 94 moves milling tool 30 out of axial alignment with the work centerline, the probe assembly 24 can be positioned in axial alignment with the work centerline by appropriate movement of transfer assembly 94, taking into account the distance between the longitudinal axes of milling tool 30 and probe assembly 24.

As shown in in FIG. 6, the probe cylinder 80 is a. hydraulically reciprocated device that moves a drive rod 98 in an axial direction, parallel with and spaced from the work centerline. Drive rod 98 depends below web 82 and connects to a L-shaped bracket 100 by threaded nut 102. An extended portion 100A of bracket 100 is mounted to the side of cylinder bracket 72 by bolts 104. The probe cylinder 80 has upper and lower hydraulic conduit and fitting assemblies 106 and 108 that connect to an external supply of hyraulic fluid (not shown) to provide controlled operation of cylinder 80 and the resulting reciprocating movement of drive rod 98 and the associated cylinder bracket 72.

Precise linear movement of probe assembly 24 along the work centerline is provided by an elongated bearing track 110 shown in FIGS. 4 and 7 centrally mounted on cylinder and slide bracket 80 by bolts 112. Bearing track 110 is surrounded on three sides by a closely spaced U-shaped bearing block 114 and together they provide a pair of opposed bearing races 116. The probe mounting bracket 70 is secured to the front side of bearing block 114 by upper and lower bolts 118 with the cylinder bracket 72 extending perpendicularly from a lower end thereof. As shown in FIGS. 3 and 6, the associated probe connector plate 74 is connected to the cylinder bracket 72 by a plurality of compression springs 120, one of which is shown in detail in FIG. 7. Each spring 120 biases between opposed cylindrical recesses 122 and 124 provided in the cylinder bracket 72 and the probe connector 74, respectively, and is held in compression fit by a recessed shoulder screw 126 threaded into the cylinder bracket 72 with a bearing materjail28 journalled around the screw shaft. The foregoing arrangement allows for compressional movement between cylinder bracket 72 and probe connector 74 for a purpose to be described.

As previously described, conduit 76 is held inside the probe connector 74 and extends upwards through an opening in cylinder bracket 72. Conduit 76 has a female connector 130 shown in FIGS. 3 and 7 that mates with probe body 78 connected to the probe 25 (probe body 78 and probe 25 are not shown in FIG. 7). Probe 25 is an elongated, cylindrically shaped member composed of successive layers of conducting and insulating patterns on a ceramic rod 25A extending from an aluminum handle 132 having an electrical connection 134 that mates with probe body 78. As shown schematically in FIG. 8, there are 48 capacitor plates 25B on probe 25 of the present illustration which are placed in six annular rings spaced axially along the length of the ceramic rod 25A. The plates of axially adjacent rings define rows of plate, two rows being shown in FIG. 8, each row having eight plates designated A through F in FIG. 8 and preferably plates A and F have the smallest surface area, plates B and E have an intermediate surface area and plates C and D have the largest surface area. That way, the capacitor plates 25B serve to measure the periphery of the hole when the probe 25 is moved to a measuring position inside the hole. Preferably plates C and D with the largest area are positioned at a central location inside the hole. A cable connector 136 is mounted on conduit 76 and interfaces with a transmission cable (not shown) connected to the controller unit which supplies power to the probe 25 and its capacitor plates 25B and that also receives and processes hole measurement data sensed by the plates 25B. The hole probe 25 including the probe body 78 is of the type commercially available from Measurement Systems Inc. of Marietta, Georgia under the designation 450A, 455A, 456A, 460A, 461A, 470A and 471A.

As shown in FIG. 6, relative or compressional movement between the cylinder bracket 72 and probe connector 74 is sensed by a first proximity switch 138 having a threaded shaft 140 that is fitted through an opening in cylinder bracket 72 and extends to a lower recess 72A therein. Opposed nuts 142 thread onto shaft 140 and abut the upper surface of ,bracket 72 and recess 72A to hold the switch 138 in place. An insulating boot 144 provides a sheath at the point where a power and data transmission cable 146 connects to the proximity switch 138 and leads to the transfer controller 322. Probe connector 74 has a lower recess 74A that receives a half dog point screw 148, preferably made of stainless steel and held in place by nut 150. Dog point 148 extends above the plane of probe connector 74 to a position in line with but spaced from the sensitive end of proximity switch 138. That way proximity switch 138 measures the capacitance between itself and dog point 148 as probe 25 is moved along the work centerline towards the hole. During such movement, if the tip or any part of probe 25 or handle 132 or body 78 contacts the workpiece 16 or a foreign object, such as a drill bit left behind during the drilling operation, such contact will cause relative movement between cylinder bracket 72 and probe connector 74 against the bias of springs 120 to change the distance between half dog point 148 and switch 138. This movement results in a capacitance change that is sensed by switch 138 to indicate a collision between probe 25 or its associated parts and an obstruction. Such indication, in turn, is utilized to stop further movment of probe assembly 24.

In a similar manner, movement of probe assembly 24 out of alignment with the work axis or centerline, such as during a collision between probe 25 and an obstruction, is measured by a second proximity switch 152 mounted in a generally lateral position with respect to plate 154 by bolts 156 with plate 154, in turn, being mounted to the side of cylinder bracket 72 by bolts 158, as shown in FIGS. 3 and 6. An associated half dog point screw 160 is mounted on a bar 162 by nut 164 with bar 162 extending from a plate 166 mounted on the side of probe connector 74 by bolts 168. An insulating right-angled boot 170 shown in FIGS. 4 and 6 serves as a sheath for transmission cable 172 leading from switch 152 and connected to the transfer controller 322. In that manner, switch 152 measures the capacitance between itself and half dog point 160 which capacitance is dependent on the distance between switch 152 and half dog point 160. During movement of probe 25 along the work centerline toward the hole, if probe 25, handle 132 or body 78 contacts the workpiece 16 or a foreign object during such movement, such contact will cause relative movement between cylinder bracket 72 and probe connector 74 to change the distance between switch 152 and half dog point 160. This movement results in a capacitance change that is sensed by switch 152 to indicate a collision which, in turn, is utilized to stop further movement of probe assembly 24.

Movement of probe assembly 24 along the work centerline is measured by an encoder read head 174 mounted on the side of a plate 176 by bolts 178 as shown in FIGS. 3, 4 and 6. Plate 176 extends from the cylinder and slide bracket 86 at an intermediate position between the probe assembly 24 and encoder read head 174 and as shown in FIG. 5, supports a third proximity switch 180 having a threaded shaft 182 with an associated cable boot 184 and transmission cable 186 connected to hole probe encoder 320. Proximity switch 180 is adjustably mounted vertically in a slot-like opening 188 in plate 176 by opposed nuts 190 threaded on shaft 182 and is provided with a read head 192 that contacts a proximity trigger plate 194 mounted to the cylinder bracket 72 adjacent probe connector 74 by bolt 196, such contact occurring when the cylinder bracket 72 is in a retracted position. This sends a first signal to the transfer controller 322 to indicate a first, fully retracted position of the probe assembly 24.. As the probe assembly 24 moves from the retracted position towards the hole, the contact between plate 194 and read head 192 is broken indicating that the probe assembly 24 is in a second position, moving towards the hole. Hole probe encoder 320 is mounted on plate 176 adjacent encoder read head 174 by a right-angle bracket 198 shown in FIG. 4 and measures the movement of probe assembly 24 along the work centerline. Encoder 320 is connected to an amplifier 200 shown in FIG. 2 mounted on the upper ram assembly 88 by cable 202 and provides for precise positioning of probe 25 inside the hole in workpiece 16 to effect an exact measurement of the hole profile. One form of encoder 320 and encoder read head 174 found to perform satisfactorily are commercially available from Futaba Corp. under the designation FM1OUA Pulscale.

The capacitor plates 25B provided on the probe 25 are capable of measuring the entire hole profile or a desired portion of the hole if, for example, it is desired to measure only the portion of the hole below a countersink. Then, if the hole measurements are within an acceptable tolerance range, a fastener can be inserted into the hole and upset by the bucking ram 26 to join the metal worksheets 18 and 20 together. Milling tool 30 then shaves the rivet head to the surface of worksheet 18, as is well known to those skilled in the art.

To summarize a basic machine cycle operation, when workpiece 16 has been properly positioned and a machine cycle is initiated by appropriate controls to the central processor 300, pressure foot 52 lowers and upset cylinder 42 actuates the clamp cylinder 46 and causes the lower head assembly 34 to rise. This clamps workpiece 16 firmly between the pressure foot of lower anvil 28 and the underside of the bushing on pressure foot 52. The clamped condition of workpiece 16 is signalled to lower head controller 306 to initiate the drilling cycle. Drill spindle 62 is rotated by motor 66 and drill ram 64 is moved downward to drill the workpiece 16 and thereby locate the hole in the workpiece 16, whereupon ram 64 is retracted. During the drilling cycle a rivet is removed from hopper 58 and placed in rivet fingers associated with an upper anvil (not shown).

Completion of drill spindle 62 retraction initiates movement of a component of the upper head assembly 32, i.e. milling tool 30, along the transfer assembly 94 a distance sufficient to position the probe inspection assembly 22 such that the axis of probe 25 is coincident with the work centerline. The probe cylinder 80 is pressurized by admitting hydraulic fluid into conduit 106 which causes drive rod 98 to extend outward from cylinder 80 to move bearing block 114 along bearing track 110. This causes the attached cylinder bracket 72 to move towards the hole with the probe member 25 moving along the work centerline until it is positioned at a centered position inside the hole. Initial movement of the probe assembly 24 towards the workpiece 16 causes trigger plate 194 to disengage from read head 192 and proximity switch 180 to signal the processor 300 that the hole probe assembly 24 has moved out of the retracted position and begun its movement towards the hole. Axial movement along the work centerline is measured by encoder 320 in conjunction with encoder read head 174 to precisely position the probe rod 25A at a centered position inside the hole where capacitor plates 25B measure a characteristic, such as the peripheral extent of the hole. This information is fed to the central processor 300 for processing and display. Providing the hole inspection apparatus on a tool of an automatic machine such as riveting apparatus 10, insures precise alignment of the axis of probe 25 with the center of the hole, i.e. with the work centerline.

In the course of travel of the probe assembly 24 along the work centerline, should the probe 25 or any other part of the assembly 24 contact the workpiece 16 or a foreign object, the probe connector 74 will move with respect to the cylinder bracket 72 and against the bias of compression springs 120. This collision movement is detected by proximity switches 138 and 152 which signal the processor 300 to discontinue movement. The problem may be that the hole inspection assembly 22 has not travelled a sufficient distance along the transfer assembly 94 or a foreign object, such as a drill bit has beenleft at the hole location. In any event, the problem is signalled and must be corrected before any further operation is performed, due to the fact that probe 25 typically is a fragile device.

After the hole perhiphery is measured, hydraulic fluid is admitted to conduit 108 which causes drive rod 98 and the connected hole probe assembly 24 to retract along the work centerline until trigger plate 194 contacts read head 192. This signals the central processor 300 that the probe assembly 24 is in a fully retracted position. The processor 300 then initiates the transfer controller 322 to signal the transfer assembly 94 to move milling tool 30 to thereby move hole inspection assembly 22 so that probe 25 is out of alignment with the work centerline. Then transfer assembly 24 moves the bucking ram 27 over the work centerline and ram 27 down strokes to move anvil 26 downward to engage the rivet held in the rivet fingers to insert the rivet into the predrilled hole in workpiece 16 and to buck the upper head of the rivet in preparation for upsetting pressure from lower ram 44. Rivet upset then is performed by actuating the lower ram hydraulic cylinder 42 forcing the lower anvil 28 to rise and upset the rivet.

Upon rivet upset, lower ram 44 descends to its working stroke height and transfer assembly 94 moves milling tool 30 over the upset rivet along the work centerline to shave the material (of the rivet head) down to the surface 18, as is well known to those skilled in the art. This completes the machine cycle and the workpiece 16 then is repositioned for the next machine cycle.

The foregoing description is of an illustrative automatic drilling and riveting machine to which the present invention is applicable. The present invention is readily applicable to other types of automatic machine tools including other types of automatic fastening machines. In this connection, the workpieces can be provided to the apparatus with preformed or pre-drilled holes, or the machine tool apparatus provided with the present invention can itself form or drill the holes which are to be inspected.

It is therefore apparent that the present invention accomplishes its objects. While an embodiment of the present invention has been described in detail, that is for the purpose of illustration, not limitation.

What is claimed is:

1. A method for measuring a characteristic of a hole provided in a workpiece, which comprises:

(a) providing an automatic apparatus comprising: a frame means defining a work axis in alignment with a hole in the workpiece positioned for operation thereon by the apparatus; a tool means having a stationary component carried by the frame means and a movable component that is movable towards and away from the workpiece along a tool axis to operate on the workpiece; and a transfer means mounted on the frame means and operatively associated with the tool means for moving the movable component of the tool means into and out of a working position wherein the tool axis is coincident with the work axis;

(b) mounting a probe means on the stationary component of the tool means, wherein the probe means defines a probe axis that is spaced from the work axis and wherein the probe means is moved by the transfer means into alignment with the probe axis being coincident with the work axis and with the tool means moved out of the working position and wherein probe means is movable axially along the work axis and into and out of the Hole provided in the workpiece;

(c) providing controlled movement of the transfer means for selectively directing movement of the respective tool means and the probe means into and out of positional alignment with the work axis;

(d) providing controlled axial movement of the probe means along the work axis to locate the probe means at a predetermined position in the hole provided in the workpiece to enable the probe means to obtain information about a characteristic of the hole; and (e) utilizing the information obtained by the probe means.

2. The method of claim 1 further including sensing resistance to movement of the probe means into the hole so that further movement of the hole probe means can be interrupted in the event that an obstruction is encountered.

3. The method of claim 1 wherein the probe axis defined by the probe means is a first determinable distance spaced from the tool axis and wherein the transfer means moves the tool means the first determinable distance out of the working position and the probe means into alignment with the probe axis being coincident with the work axis and wherein the probe means is moved axially along the work axis towards the predetermined position inside the hole.

4. The method claim 1 wherein the probe means comprises a probe member extending from a connector means which is joined by a biasing means to a. bracket means connected to the stationary component of the tool means and further including the steps of:

(a) spacing the bracket means and the connector means apart by the biasing means to define a second determinable distance; and (b) measuring the second determinable distance so that as the probe means moves axially along the work axis towards the predetermined position in the hole, should the probe means contact the workpiece or a foreign object before locating at the predetermined position, the probe means and the connector means yield on the biasing means with respect to the bracket means to change the second determinable distance, the change being measured to signal discontinuing the axial movement of the probe means.

5. A method for measuring a characteristic of a hole provided in a workpiece, which comprises:

(a) providing an automatic fastening machine comprising: a frame means defining a work axis in alignment with a hole in a workpiece positioned for operation thereon by the machine; a tool means having a stationary component carried by the frame means and a movable component that is movable towards and away from the workpiece along a tool axis to operate on the workpiece; a fastener inserting and forming means having a stationary component carried by the frame means and a movable component that is movable towards and away from the workpiece along a fastening axis to.insert a fastener into the hole provided in the workpiece and for forming a head on the inserted fastener; and a transfer means mounted on the frame means for selectively moving each of the tool means and the fastener inserting and forming means into and out of a working position wherein the respective tool axis and the fastening axis of the tool means and the fastener inserting and forming means, respectively, is coincident with the work axis;

(b) mounting a probe means on a support means comprising the stationary compo.nent of a selected one of the tool means and the fastener inserting and forming means and defining a probe axis that is spaced from the work axis when the selected one of the tool means and the fastener inserting and forming means is in the working position and wherein the probe means is movable into alignment with the probe axis being coincident with the work axis as the transfer means moves the support means out of positional alignment with the work axis and wherein the probe means is movable axially along the work axis and into and out of the hole provided in the workpiece;

(c) providing controlled movement of the transfer means for selectively directing movement of the support means and the probe means into and out of positional alignment with respect to the work axis;

(d) providing controlled axial movement of the probe means along the work axis to locate the probe means at a predetermined, position in the hole provided in the workpiece to enable the probe means to obtain information about a characteristic of the hole; and (e) utilizing the information obtained by the probe means.

6. The method of claim 5 further including sensing resistance to movement of the probe means into the hole so that further movement of the probe means can be interrupted in the event of an obstruction is encountered.

7. The method of claim 5 wherein the probe axis defined by the probe means is a first determinable distance spaced from the tool axis defined by the tool means so that the tool means in conjunction with the tranfer means serves to a locate means for locating the hole in the workpiece and wherein the probe means is a second determinable distance spaced from the fastening axis and wherein the transfer means moves the tool means the first determinable distance out of the working position with the probe means moving into alignment with the probe axis being coincident with the work axis and wherein the probe means moves axially along the work axis towards the predetermined position to measure the characteristic of the hole and the axial movement being interrupted if the probe means contacts the workpiece or a foreign object before the probe means locates at the predetermined position and wherein the transfer means then moves the probe means the second determinable distance out of alignment after the probe means has measured the characteristic of the hole and moves the fastener inserting and forming means into the working position with the fastening axis being coincident with the work axis for inserting the fastener into the hole provided in the workpiece and for forming a head on the inserted fastener if the characteristic. of the hole obtained by the probe means is within a predetermined range.

8. The method of claim 5 wherein the probe means comprises a probe member extending from a connector means which is joined by a biasing means to a bracket means connected to the support means and further including the steps of:

(a) spacing the bracket means and the connector means apart by the biasing means to define a second determinable distance; and (b) measuring the second determinable distance so that as the probe means moves axially along the work axis towards the predetermined position in the hole, should the probe contact the workpiece or a foreign object before locating at the predetermined position, the probe means and the connector means yield on the biasing means with respect to the bracket means and change the second determinable distance, the change being measured to signal discontinuing the axial movement of the probe means.

* * * * *